US008943874B2

(12) United States Patent
Lerner et al.

(10) Patent No.: US 8,943,874 B2
(45) Date of Patent: Feb. 3, 2015

(54) CONSTRUCTION MACHINE

(75) Inventors: Thomas Lerner, Oggelshausen (DE); Roland Bohnacker, Blaubeuren (DE)

(73) Assignee: Liebherr-Werk Ehingen GmbH, Ehingen/Donau (DE)

( * ) Notice: Subject to any disclaimer, the term of this patent is extended or adjusted under 35 U.S.C. 154(b) by 893 days.

(21) Appl. No.: 13/071,847

(22) Filed: Mar. 25, 2011

(65) Prior Publication Data

US 2011/0232375 A1 Sep. 29, 2011

(30) Foreign Application Priority Data

Mar. 26, 2010 (DE) ........................ 10 2010 012 888

(51) Int. Cl.
*G01M 1/00* (2006.01)
*B66C 23/90* (2006.01)
*B66C 23/78* (2006.01)

(52) U.S. Cl.
CPC ............... *B66C 23/905* (2013.01); *B66C 23/78* (2013.01)
USPC ........................................ 73/65.01; 73/65.02

(58) Field of Classification Search
USPC ........................................................ 73/65.01
See application file for complete search history.

(56) References Cited

U.S. PATENT DOCUMENTS 4,732,286 A 3/1988 Koenig
5,426,995 A * 6/1995 Maennle ........................ 74/506
5,621,179 A * 4/1997 Alexander .............. 73/862.331
5,864,781 A * 1/1999 White .......................... 702/182
6,311,402 B1 * 11/2001 Brandl et al. ................ 33/1 PT
7,014,054 B2 * 3/2006 Yahiaoui et al. ............. 212/277
2006/0045661 A1 * 3/2006 Andersson ................ 414/140.3
2008/0061022 A1 * 3/2008 Willim .......................... 212/196
2009/0200860 A1 * 8/2009 Pech et al. ................... 305/124
2012/0117810 A1 * 5/2012 Schroder ...................... 33/1 PT

FOREIGN PATENT DOCUMENTS

DE 1556339 2/1970
DE 3937760 A1 * 7/1990 ............. B66C 23/90
EP 0186860 A2 7/1986
EP 1925585 A1 5/2008

OTHER PUBLICATIONS

German Patent and Trademark Office, DE Search Report of 10 2010 012 888.0, Jan. 24, 2011, 4 pages.

* cited by examiner

*Primary Examiner* — Lisa Caputo
*Assistant Examiner* — Jamel Williams
(74) *Attorney, Agent, or Firm* — Alleman Hall McCoy Russell & Tuttle LLP

(57) ABSTRACT

The present disclosure relates to a construction machine having an undercarriage; a superstructure rotatably supported relative to the undercarriage by a revolving roller connection; and a control system, wherein measuring devices are arranged in the revolving roller connection for the force measurement in the directions of pulling and compression, and the control system determines the force in the axis direction of the axis of rotation as well as the torque which is caused by the eccentricity of the force with respect to the axis of rotation from the detected measured values of the measuring devices. From this, improved monitoring of the operational safety and stability of such a construction machine is achieved.

17 Claims, 4 Drawing Sheets

CONSTRUCTION MACHINE

CROSS REFERENCE TO RELATED APPLICATION

This application claims priority to German Patent Application No. 10 2010 012 888.0, entitled "Construction Machine", filed Mar. 26, 2010, which is hereby incorporated by reference in its entirety for all purposes.

BACKGROUND AND SUMMARY

The present disclosure relates to a construction machine having an undercarriage; a superstructure rotatably supported relative to the undercarriage by a revolving roller connection; and a control system. The present disclosure further relates to a method of monitoring the operational safety or the stability of a construction machine.

TECHNICAL FIELD

The stability and operational safety of a construction machine during operation at the deployment location is determined by a plurality of diverse parameters. The stability of a crane, in particular of a mobile crane, for example, depends inter alia on the luffing angle of the boom and on the pivot angle of the superstructure with respect to the undercarriage and the position of the support legs, in addition to the size of the load suspended at the boom.

To allow a continuous monitoring of the stability of the construction machine, different possibilities for monitoring the stability of a crane or of a construction machine can already be seen from the prior art. A known method is e.g. the force measurement in the support of the construction machine. In this process, a construction machine is installed on the ground via four symmetrically arranged supports, for example, and the forces are measured continuously individually in each support. The position of the center of gravity and the total mass of the construction machine can thereby be determined. A method which determines the stability in connection with the base quadrilateral of the four-point support is known from DE 20 2006 017 724 U1.

The measurement of the four part forces in the supports can furthermore be used for calculating a resulting force and a resulting torque which engage at an imaginary sectional plane at the level of the revolving assembly.

Such methods, however, have some fundamental deficiencies. If the construction machine, in particular a crane, is not supported by its support apparatus or if it has no support at all under certain circumstances, the aforesaid method cannot be used. Examples of this include the travel of a construction machine at a construction site as well as the crane travel of a crawler-mounted crane, which as a rule dispenses with a support during the crane work. The monitoring of the stability of the construction machine plays an essential role during the operation of the construction machine.

A further disadvantageous aspect of the aforesaid method is given in that external influences, in particular disturbance forces which do not act in a vertical direction, are not taken into account in the determination or in the monitoring of the stability. Examples include the engaging wind forces and downhill forces acting on the crane.

A further known method in the measurement directly in the revolving assembly or in the connection between the revolving assembly and structural steelwork through construction elements such as modified screws.

This method has the disadvantage that the measuring devices used there have to be attached directly to the connection elements and thus react sensitively to disturbances, in particular due to the pretensioning of the connection point. The unintended loosening of screw connection elements can in particular falsify the measured results.

It is the underlying object of the present disclosure to further develop a construction machine of the initially named kind such that a more reliable and more precise determination of the stability/operational safety can be ensured. This object is achieved by a construction machine that includes an undercarriage, a superstructure rotatably supported relative to the undercarriage by a revolving roller connection and a control system. In accordance with the present disclosure, the construction machine has one or more measuring devices for measuring the forces on the revolving roller connection in the pulling direction, the compression direction and the horizontal direction in the region of the revolving roller connection. The construction machine furthermore includes a control system for determining the applied resulting force, preferably in the axial direction of the axis of rotation, as well as for determining the torque which is caused by the eccentricity of the force with respect to the axis of rotation. Both components, force and torque, are determined on the basis of the measured values of sensors, as example measuring devices. The present disclosure is therefore directed to measuring the characteristics required for determining or for monitoring the stability of the work machine at a different position at which fewer disturbance forces occur. In accordance with the present disclosure, the region around, in particular above or below, the revolving roller connection between the superstructure and the undercarriage of the construction machine is suitable as the optimum measuring point. The control system is able to determine forces on the revolving roller connection in the directions of pulling and compression, whereby the tension development in the measurement plane of the measuring device can be determined with sufficient exactness.

A ring-shaped measuring element can be used as the measuring device whose longitudinal axis extends in the revolving roller connection from the undercarriage to the superstructure. A spacer ring element is particularly suitable. The ring-shaped measuring element can either be present in the region of the revolving roller connection, that is, an already existing component is used about the revolving roller connection for detecting the named forces, or a ring-shaped measuring element is installed for detecting the forces in the directions of pulling and compression in the region of the revolving roller connection. Construction machines of a similar category can be retrofitted easily and particularly inexpensively.

One or more sensors are advantageously introduced into the measuring element for detecting the forces acting on the ring-shaped measuring element. It is conceivable that a plurality of sensors are arranged distributed over the total periphery of the measuring element, that is, in the range between 0° and 360°. These measuring sensors are able to determine the forces acting on the measuring element in the directions of pulling and compression independently of the angle of rotation of the superstructure.

The measuring plane of the ring-shaped measuring element used is sufficiently spaced away from the screw connection plane of the revolving assembly/structural steel structure so that local tensions arising due to the screw connection do not interfere with the measuring precision. In addition, the sensors can be decoupled from external influences (weather/installation).

To forward the detected measured values to the control system of the construction machine, it is expedient that some or all sensors communicate with the control system via a communications interface, in particular via a bus system. Alternatively, a local communications unit can also be integrated to which all measured sensor values are supplied and these are then forwarded from the local communications unit to the control system of the construction machine.

One or more measuring sensors are configured in cylindrical form in an advantageous embodiment of the present disclosure. The cylindrical measuring sensors can be releasably or fixedly introduced into corresponding bores of the ring-shaped measuring element.

It is alternatively or additionally possible to arrange one or more axial strain gages distributed over the periphery of the measuring element. The stretching or compression of the ring-shaped measuring element can hereby be determined in the axial direction and can preferably be directly forwarded to the control system of the construction machine or via a local communications unit to the control system of the construction machine. The attachment of the strain gages may take place by adhesive bonding.

An inclinometer can preferably be provided at the construction machine for providing further measured values which enter into the monitoring of the stability or operational safety of the construction machine. The inclinometer, for example, detects the inclination of the superstructure about a vertically standing axis. It is likewise conceivable that the inclination of an installed piece of equipment on the construction machine with respect to a defined axis is detected by the inclinometer and is forwarded to the control system.

A measured value sensor can furthermore advantageously be provided at the ballast receiver of the construction machine and transfers the detected measured values to the control system of the construction machine. The implementation of a measured value sensor at the ballast receiver, in particular at the central ballast receiver of the undercarriage, allows the control of the manual input of the ballast used or of the correction of an erroneous input into the control system of the construction machine.

The present disclosure furthermore relates to a crane, in particular to a crawler-mounted crane or to a mobile crane, which is configured in accordance with one of the aforesaid features. The monitoring of the operational safety or of the stability of the crane by the control system is thus ensured at all times, in particular during the construction site travel of a crawler-mounted crane or of a mobile crane or during the total crane work of a crawler-mounted crane which as a rule dispenses with a support apparatus. It is likewise conceivable that the stability can also be monitored during the independent setting up of the crane.

The present disclosure furthermore relates to a method for monitoring the operational safety or stability of a working machine having an undercarriage; a superstructure rotatable relative to the undercarriage by a revolving roller connection; and a control system. To allow the stability independently of any used support apparatus, provision is made in accordance with the present disclosure that the control system of the construction machine determines the force in the axial and horizontal directions of the axis of rotation of the superstructure as well as the torque which is caused by the eccentricity of the force with respect to the axis of rotation on the basis of the measured pulling and compression forces in the revolving roller connection. The parameters, that is, the force in the axial direction of the axis of rotation and the torque, for the first time take account of all strains which the undercarriage experiences through the superstructure. In addition, a force acting perpendicular to the axis of rotation could also be determined. This includes the external influences, previously not considered, of the disturbance forces which do not act in the vertical direction. This category includes, for example, attacking wind forces, downhill forces, not exactly defined forces in multi-hook operation of a crane, current position of the masses or the filling levels of the tanks in the superstructure.

It is a significant advantage of the present disclosure that the two parameters of force and torque are also always currently known on the moving or locomotion of the construction machine at the deployment site even with changed conditions of the control system. The steering forces which occur furthermore do not influence the measurements in the region of the revolving roller connection since all steering forces are taken up by the center part of the undercarriage.

The determination of the forces applied to the central ballast receiver of the undercarriage and the forwarding of the determined forces to the control system of the construction machine are also of advantage. The measured data obtained can likewise go into the monitoring.

It is conceivable that additionally the dimension and the weight of specific machine components are known to the control system for monitoring the stability or the operational safety. Furthermore, specific center of gravity positions of the construction machine can be stored in the control system. Accordingly, these data are also taken into account during the monitoring of the stability or of the operational safety.

The tilting edges of the construction machine during travel at the deployment location or during the non-supported operation of the construction machine can in particular be determined on the basis of the configuration data.

The metrologically detected inclination of the superstructure or of installed pieces of equipment can additionally be taken into account in the determination of the stability or of the operational safety of the construction machine by the control system via an inclinometer provided at the construction machine.

The method in accordance with the present disclosure in accordance with one of the aforesaid features is in particular used in the determination of the stability or of the operational safety of a crawler-mounted crane or mobile crane. The undercarriage as a rule has known dimensions and weights both in the crawler-mounted crane and in the mobile crane. The data in this respect can thus be added by the crane control system to the two determined parameters of force and torque. In addition to the monitoring of the operational safety and of the stability of the crawler-mounted crane or the mobile crane, a conclusion can also be drawn via the crawler geometry and/or the track pads on the currently present ground pressure of a crawler-mounted crane if an areal contact of the crawler-mounted crane is ensured. Analogously, on the use of the method with a mobile crane, the permitted load of the respective axles and/or of the tires can be inspected.

The crane in accordance with the present disclosure can advantageously be monitored with respect to the stability and to the operational safety during the independent setting up. Since the current parameters of force and torque are always present, it is irrelevant which components have already been attached to the crane in the setting up and which still have to be installed during the self-setting up process.

The construction machine and the corresponding method is naturally also fully functional when a support is used. A force measurement in the support apparatus can accordingly be applied as a diverse measuring method for determining the stability and the operational safety of the crane.

Further details and advantages of the present disclosure will be explained with reference to an embodiment shown in the drawings.

DETAILED DESCRIPTION

Figure 1:
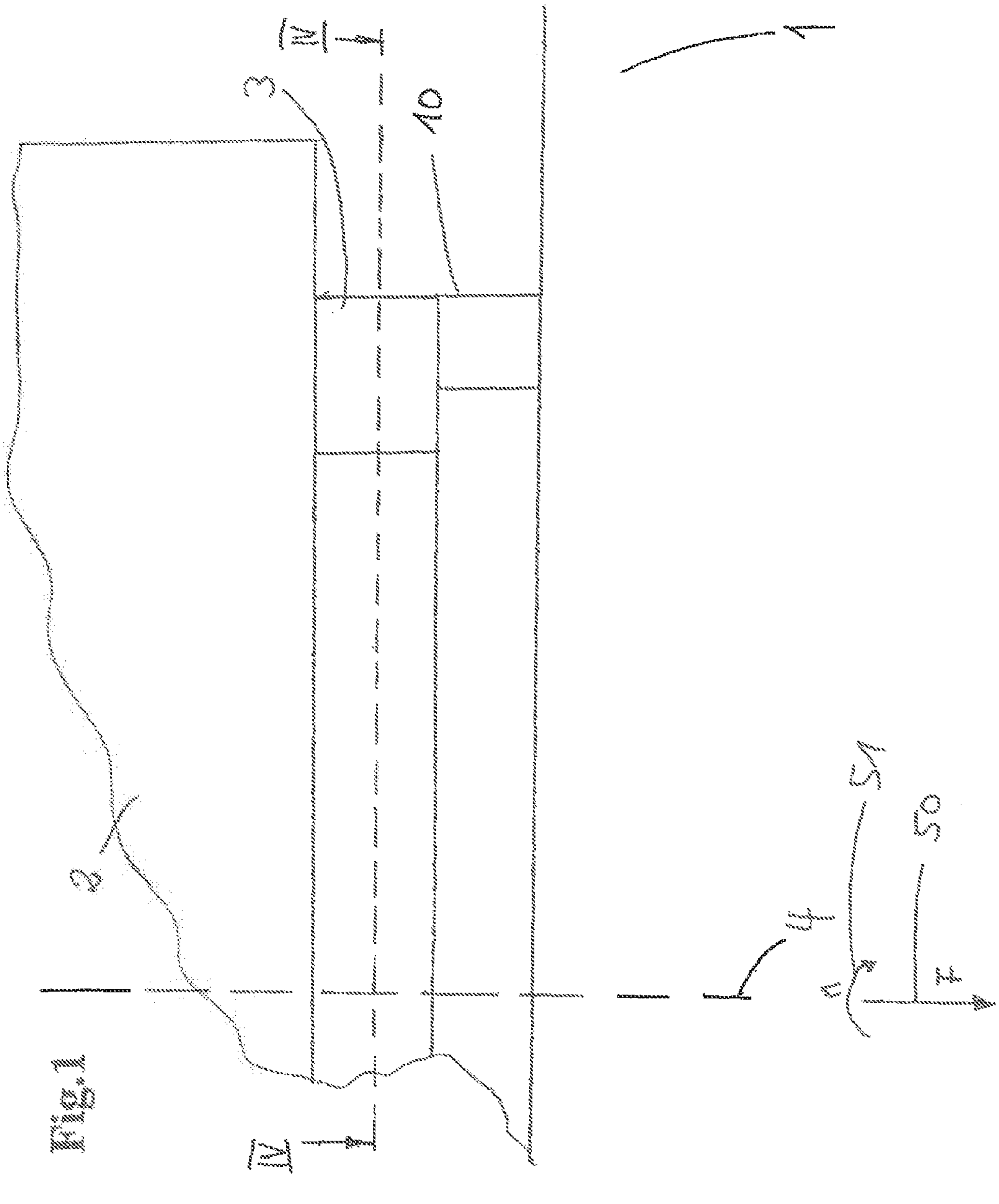
FIG. 1 shows a schematic representation of the revolving roller connection between the superstructure and the undercarriage of the construction machine in accordance with the present disclosure.

FIG. 1 shows a schematic representation of the revolving roller connection 3 between the undercarriage 1 and the superstructure 2 of a construction machine in accordance with the present disclosure in the form of a crane, such that the superstructure rotates with respect to the undercarriage. To transfer the required measured values with respect to the forces on the roller connection 3 in the directions of pulling and compression to the crane control system 22 (see FIG. 4), a purposefully installed spacer ring element 10 is used between the superstructure 2 and the undercarriage 1. The superstructure 2 may pivot about a pivot angle with respect to the undercarriage, and further the superstructure 2 may include a boom having a luffing angle, with a load suspended from the boom. The crane may include a multi-hook boom configuration, as well as installed winches for winding up various ropes on the crane. The spacer ring element 10 may be freely inserted between the undercarriage 1 and the roller connection 3, or it may be fixedly coupled to the undercarriage 1, or the roller connection 3.

Different measuring devices or measuring devices of the same kind are introduced into the ring-shaped measuring element 10 in the form of sensors 20 or also of monoaxial strain gages distributed from 0 to 360° in the periphery which serve for measuring the forces acting on the ring-shaped measuring element 10. The measuring sensors 20 are able to determine or indicate forces in the direction of pulling and compression and transmit such data to the control system. Sufficiently exact statements on the tension development in the ring-shaped element 10 can then be made in the control system with reference to the measured values and conclusions of the forces or torques can be drawn therefrom.

Figure 2:
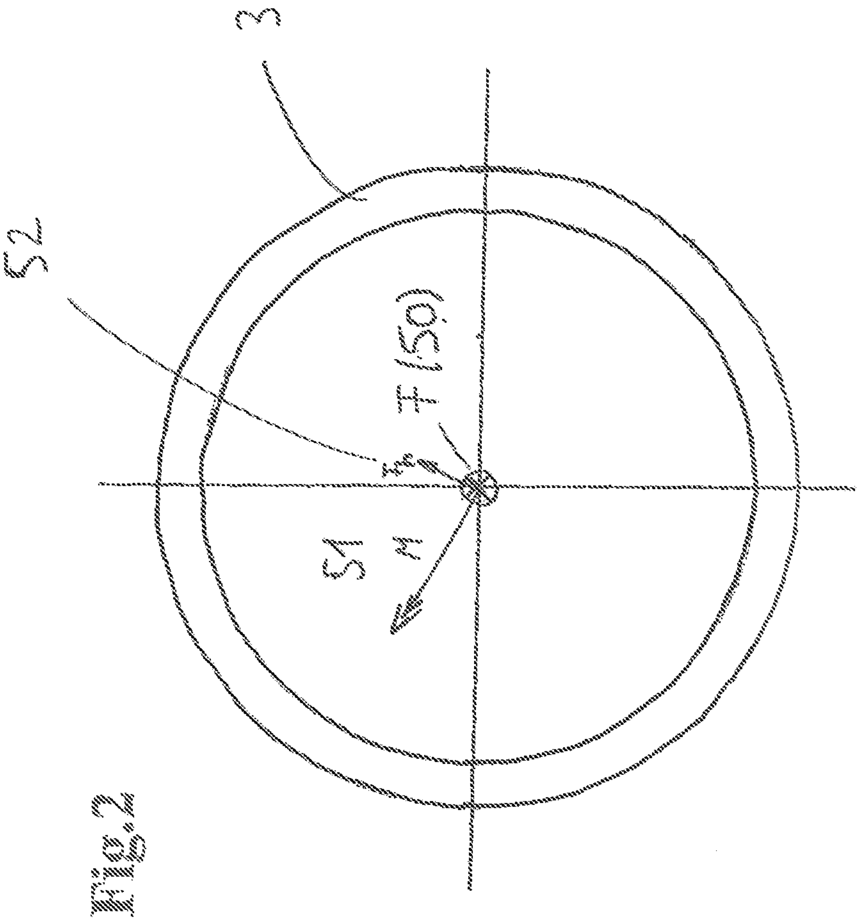
FIG. 2 shows a sectional representation in accordance with the sectional line IV-IV of FIG. 1.

The crane control system 22 determines a resulting force 50 from the data provided by the measuring sensors or from the monoaxial or multiaxial strain gages, said force acting in the direction of the axis of rotation 4 and perpendicular to the axis of rotation. FIG. 2 shows a representation of the revolving roller connection 3 along the horizontally extending sectional axis IV-IV. The force 50 determined points into the plane of the drawing as a compressive force. The control system 22 furthermore determines the torque 51, which is caused by the eccentricity of the force 50 with respect to the axis of rotation 4, from the data detected by the measuring sensors 20. In one specific example, the measured forces from all of the sensors are resolved into a single force and torque pair, with the force 50 in one example, being in the axial direction of the axis of rotation of the roller connection, and the torque 51 being the moment caused by the eccentricity of the force 50. Both parameters, that is, the force 50 and the torque 51, for the first time consider all loads which the undercarriage 1 experiences through the superstructure 2. This also includes attacking wind forces, downhill forces and forces which are not exactly defined with a multi-hook operation of the crane, winches, filling levels of the tanks and the like. The influence of the installed winches also has different effects on the stability of the crane in dependence on the quantity of rope wound up. These non-specific parameters are also taken into account by the optimally positioned force measurement at the revolving roller connection 3. Thus, from the force/torque pair, it is possible to provide improved monitoring of the crane's stability.

Figure 3:
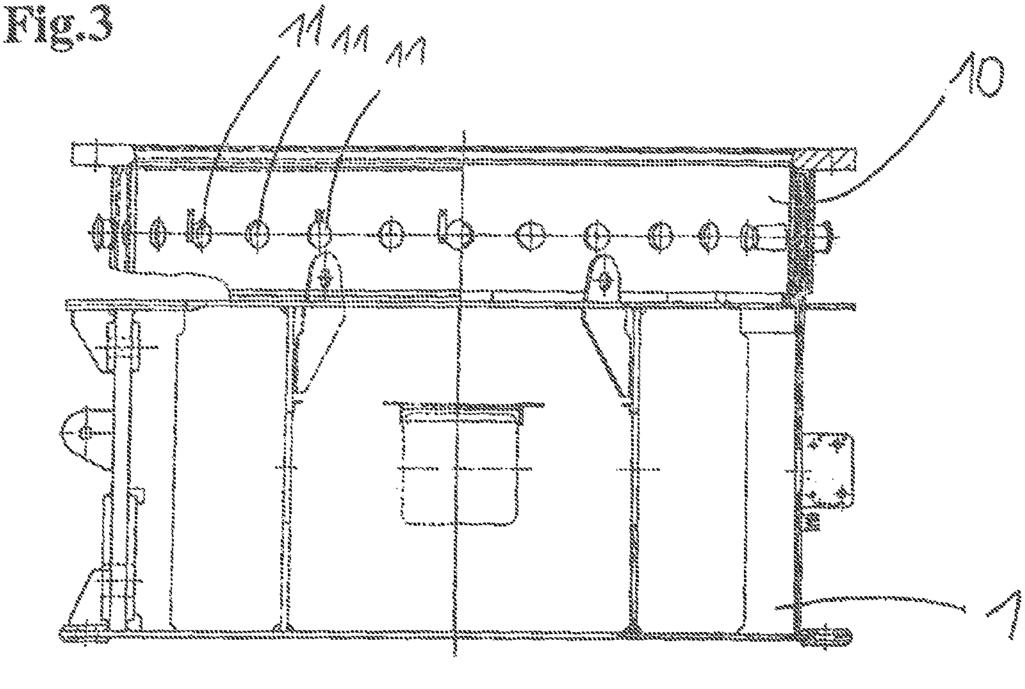
FIG. 3 shows a further representation of the ring-shaped measuring element used in the region of the revolving roller connection.

FIG. 3 again shows a detail view of the ring-shaped measuring element 10 used at the revolving roller connection 3 between the undercarriage 1 and the superstructure 2. The individual measuring sensors 20 are configured in cylinder shape and are introduced into the corresponding bores 11 of the ring-shaped measuring element distributed in the range over 360°.

The comparatively very simple manner of the implementation of the measuring apparatus in accordance with the present disclosure provides a problem-free possibility of retrofitting existing cranes fast and simply or inexpensively. Since the revolving roller connection 3 is separably connected to the undercarriage 1, the ring-shaped measuring element 10 in accordance with the present disclosure can be inserted subsequently at this connection point. The changed geometrical conditions with respect to the height of the measuring element 10 can be neglected. The working load tables available can continue to be used and the maximum hoisting heights are not reduced.

It is also always ensured during the travel of the crane by the direct detection of the parameters of force 50 and torque 51 in the area of the revolving roller connection that the current and actual force values in the area of the revolving roller connection are also known to the control system under changing conditions, in particular with variable external influences on the crane. It in particular proves to be an advantage during the travel of the crane that the steering forces which occur do not influence the measurement. They are instead completely taken up by the center part of the undercarriage.

Figure 4:
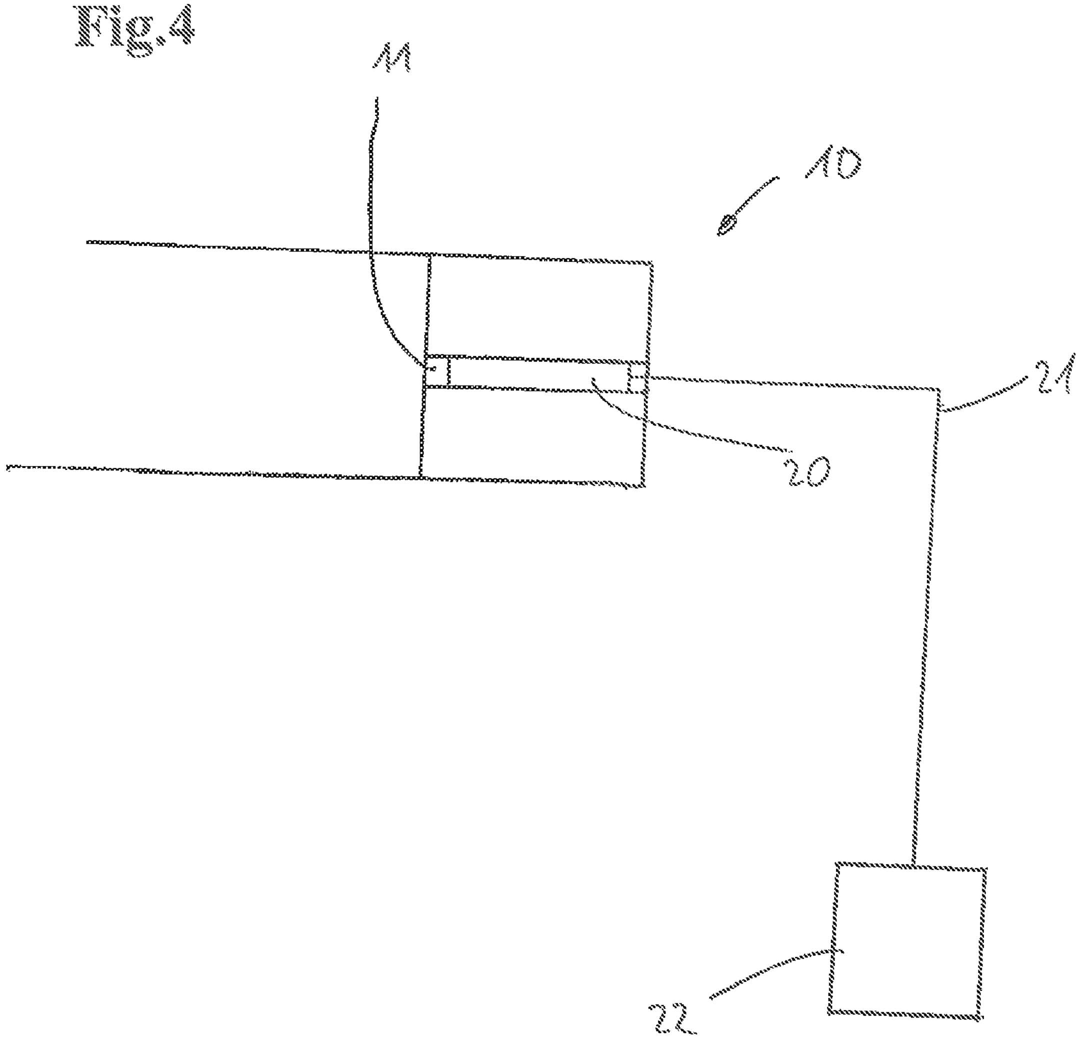
FIG. 4 shows a schematic representation of the communication between the measuring device and the crane control system.

FIG. 4 shows a schematic representation of the communication between the sensors 20 and the crane control system 22. In detail, a part region of the ring-shaped measuring element 10 can be seen from FIG. 4, with a sleeve-shaped sensor 10 being introduced into the bore 11 of the measuring element 10 provided for this purpose. The measuring sensor 20 is connected to the crane control system 22 via a data connection, in particular via the bus system 21. On the one hand, there is the possibility of connecting every single sensor 20 to the crane control 22 via the bus system 21. Alternatively, the implementation of a local communications unit proves to be advantageous which takes over the data communication with all or at least some of the sensors 20 and subsequently transmits the sensor values to the crane control 22 via the bus system 21. An unnecessary strain on the bus system 21 with too high a bus subscriber number is hereby avoided.

Optionally, the determined data of a force measurement at the central ballast receiver of the crane can be supplied to the control system 22 via the bus system 21 in order optionally to correct or recognize an erroneous manual input with respect to the ballast provision of the crane.

There is furthermore the possibility that specific data sets with respect to the dimensions and the weights of the individual crane components are available to the crane control system 22. This generally also includes the position of defined centers of gravity in the crane system, in particular in the undercarriage. There is thus the possibility that the crane control system 22 adds the known parameters of the undercarriage to the determined parameters of force 50, torque 51 and, optionally, a further force perpendicular to the force 50, and also includes them in the monitoring of the stability or of the operational safety of the crane. Especially with crawler-mounted cranes, statements can be made from the data sets determined with the aid of the crawler geometry and of the pad tracks on the present, currently applied ground pressure if an areal contact of the crane is ensured. It may be necessary for this purpose that mattresses are used.

If the crane is configured as a mobile crane, the use of the aforesaid data set allows the checking or determination of the permitted axle load and of the corresponding tire rating.

Furthermore, the crawler length and the track pad width or the spacings of the tires, the tilting edges during the traveling at the construction site or during unsupported work of the crane can be determined from the known dimensions of the undercarriage such as the crawler spacing.

The use of the aforesaid measuring apparatus in accordance with the present disclosure does not preclude the monitoring of the stability of a crane in combination with the method known from the prior art such as the force measurement in the support apparatus. Both systems can be used in a crane for the realization of a diverse measuring method to obtain an increase in the operational safety of the crane.

In this way, it is possible for the crane's electronic control system to determine various monitoring parameters from measured data and input parameters, and from this generate indications of the crane safety which can be automatically communicated to the crane operator, for example, or used to automatically limit crane operating parameters, such as boom extension, and the like. For example, from the determined force and torque at the connection between the superstructure and the undercarriage, along with data on the crane support geometry, it is possible to determine standing safety of the crane and whether it may heel or tip, and thus set alarms, generate warning indications, and/or limit parameters.

The invention claimed is:

1. A construction machine comprising:
- an undercarriage;
- a superstructure rotatably supported relative to the undercarriage about a vertical axis by a revolving roller connection;
- one or more force measuring devices arranged in a region of the revolving roller connection; and
- a control system receiving information from the one or more measuring devices including a ring-shaped measuring element coupled to the revolving roller connection and determining one or more resulting forces in an axial direction and perpendicular to the axis of rotation based on the information, the control system further determining an equivalent torque caused by eccentricity of the one or more resulting forces relative to the vertical axis.

2. A construction machine in accordance with claim 1, wherein one or more sensors are arranged, distributed over a periphery of the ring-shaped measuring element.

3. A construction machine in accordance with claim 2, wherein each of the one or more sensors is connected to the control system via a bus connection.

4. A construction machine in accordance with claim 2, wherein a communications unit is provided which forwards the sensor data to the control system via a bus system.

5. A construction machine in accordance with claim 2, wherein the one or more sensors are sleeve-shaped or cylindrical-shaped and are positioned in corresponding bores of the ring-shaped measuring element.

6. A construction machine in accordance with claim 1, wherein one or more axial strain gages are arranged, distributed over a periphery of the ring-shaped measuring element.

7. A construction machine in accordance with claim 1, further comprising an inclinometer which detects an inclination of the superstructure or of an installed piece of equipment and forwards it to the control system via a communication line.

8. A construction machine in accordance with claim 1, further comprising a sensor arranged at a ballast receiver of the undercarriage that forwards a detected measured value to the control system.

9. A construction machine in accordance with claim 1, wherein the construction machine includes a crawler-mounted crane.

10. A method of monitoring the operational safety and stability of a construction machine having an undercarriage; a superstructure rotatably supported relative to the undercarriage by a revolving roller connection about an axis of rotation; and a control system, comprising:
- determining, in the control system, a force in an axial direction of the axis of rotation of the revolving roller connection, calculating a force in a horizontal direction on the basis of a thrust force measured at the revolving roller connection, determining a torque which is caused by eccentricity of the forces with respect to the axis of rotation on the basis of measured pulling forces and compression forces at the revolving roller connection between the superstructure and the undercarriage; and monitoring the construction machine based on the force and the torque.

11. A method in accordance with claim 10, wherein the force and the torque are determined during travel of the construction machine via the control system.

12. A method in accordance with claim 10, further comprising determining forces applied at a central ballast receiver of the undercarriage, and monitoring standing safety of the construction machine based on the forces applied at the central ballast receiver.

13. A method in accordance with claim 10, wherein monitoring the construction machine is further based on dimensions and weights of specific machine components and/or based on specific center of gravity positions.

14. A method in accordance with claim 13, wherein the control system further determines stability of the construction machine during travel of the construction machine at a deployment site or during unsupported operation of the construction machine from the determined data, including based on dimensions or weights of specific machine components, wherein the control system compares these values with a base quadrilateral previously determined from geometry of a crane configuration to determine standing stability of the construction machine.

15. A method in accordance with claim 10, wherein the control system takes account of an inclination of the construction machine determined by an inclinometer.

16. A method of monitoring the operational safety and stability of a construction machine having an undercarriage; a superstructure rotatably supported relative to the undercarriage by a revolving roller connection about an axis of rotation; and a control system, comprising:
- determining, in the control system, a force in an axial direction of the axis of rotation of the revolving roller connection, determining a torque which is caused by eccentricity of the force with respect to the axis of rotation on the basis of measured pulling forces and compression forces at the revolving roller connection between the superstructure and the undercarriage; and monitoring the construction machine based on the force and the torque, including determining stability of a crawler-mounted crane or of a mobile crane based on a determined ground pressure or applied axial and tire load.

17. A method in accordance with claim 16, wherein the operational safety and stability is monitored by the control system during an independent setting up of the crane.

* * * * *